US011186125B2

(12) United States Patent
Iga

(10) Patent No.: US 11,186,125 B2
(45) Date of Patent: Nov. 30, 2021

(54) PNEUMATIC TIRE

(71) Applicant: The Yokohama Rubber Co., LTD., Tokyo (JP)

(72) Inventor: Koshi Iga, Hiratsuka (JP)

(73) Assignee: The Yokohama Rubber Co., LTD.

( * ) Notice: Subject to any disclaimer, the term of this patent is extended or adjusted under 35 U.S.C. 154(b) by 433 days.

(21) Appl. No.: 16/090,811

(22) PCT Filed: Aug. 30, 2017

(86) PCT No.: PCT/JP2017/031201
§ 371 (c)(1),
(2) Date: Oct. 2, 2018

(87) PCT Pub. No.: WO2018/043577
PCT Pub. Date: Mar. 8, 2018

(65) Prior Publication Data
US 2019/0092102 A1 Mar. 28, 2019

(30) Foreign Application Priority Data
Aug. 31, 2016 (JP) .............................. JP2016-170294

(51) Int. Cl.
*B60C 11/11* (2006.01)
*B60C 11/13* (2006.01)
(Continued)

(52) U.S. Cl.
CPC .......... *B60C 11/1353* (2013.01); *B60C 11/03* (2013.01); *B60C 11/0302* (2013.01);
(Continued)

(58) Field of Classification Search
CPC ............. B60C 11/0302; B60C 11/1353; B60C 11/1369; B60C 2011/0353;
(Continued)

(56) References Cited

U.S. PATENT DOCUMENTS 5,044,414 A * 9/1991 Ushikubo ........... B60C 11/1323
152/209.24
5,127,455 A * 7/1992 Remick ............... B60C 11/0306
152/209.24
(Continued)

FOREIGN PATENT DOCUMENTS

CN 1895918 1/2007
CN 104955660 9/2015
(Continued)

OTHER PUBLICATIONS

International Search Report for International Application No. PCT/JP2017/031201 dated Dec. 5, 2017, pages, Japan.

*Primary Examiner* — Steven D Maki
(74) *Attorney, Agent, or Firm* — Thorpe North & Western

(57) ABSTRACT

A pneumatic tire includes a plurality of circumferential main grooves, a plurality of lug grooves, and a plurality of blocks. Raised bottom portions are formed on groove bottoms of shoulder circumferential main grooves that are the circumferential main grooves, among the plurality of circumferential main grooves, positioned most outward in a tire lateral direction, and shoulder lug grooves that are the lug grooves, among the plurality of lug grooves, positioned outward from the shoulder circumferential main grooves in the tire lateral direction and connected to the shoulder circumferential main grooves from outer sides in the tire lateral direction. The raised bottom portions are formed so as to exclude at least intersection portions where the shoulder circumferential main grooves and the shoulder lug grooves intersect.

18 Claims, 8 Drawing Sheets

(51) Int. Cl.
*B60C 11/03* (2006.01)
*B60C 11/12* (2006.01)

(52) U.S. Cl.
CPC ...... *B60C 11/0306* (2013.01); *B60C 11/1204* (2013.01); *B60C 11/1236* (2013.01); *B60C 11/13* (2013.01); *B60C 11/1369* (2013.01); *B60C 2011/0353* (2013.01); *B60C 2011/0355* (2013.01); *B60C 2011/0365* (2013.01); *B60C 2011/0367* (2013.01); *B60C 2011/0369* (2013.01); *B60C 2011/1227* (2013.01); *B60C 2011/1361* (2013.01); *Y02T 10/86* (2013.01)

(58) Field of Classification Search
CPC ..... B60C 2011/0355; B60C 2011/0365; B60C 2011/0367; B60C 2011/0369; B60C 2011/1361; B60C 11/1323
See application file for complete search history.

(56) References Cited

U.S. PATENT DOCUMENTS

| | | | | |
|---|---|---|---|---|
| 5,316,062 | A * | 5/1994 | Lurois | B60C 11/0309 |
| | | | | 152/209.22 |
| 6,220,322 | B1 | 4/2001 | Matsuura | |
| 2007/0012389 | A1 * | 1/2007 | Ito | B60C 11/12 |
| | | | | 152/209.22 |
| 2007/0062626 | A1 | 3/2007 | Oyama | |
| 2014/0130949 | A1 * | 5/2014 | Maehara | B60C 11/0302 |
| | | | | 152/209.8 |
| 2015/0083306 | A1 * | 3/2015 | Colby | B29D 30/56 |
| | | | | 156/96 |
| 2015/0298506 | A1 | 10/2015 | Katayama et al. | |
| 2015/0328936 | A1 | 11/2015 | Colby et al. | |
| 2017/0028790 | A1 * | 2/2017 | Shmagranoff | B60C 11/0306 |

FOREIGN PATENT DOCUMENTS

| | | |
|---|---|---|
| JP | H11-227419 | 8/1999 |
| JP | 2001-180227 | 7/2001 |
| JP | 2002-264614 | 9/2002 |
| JP | 2007-022151 | 2/2007 |
| JP | 2007-112421 | 5/2007 |
| JP | 2012-101745 | 5/2012 |
| JP | 2014-051287 | 3/2014 |
| JP | 2015-013514 | 1/2015 |
| WO | WO 2013/148355 | 10/2013 |
| WO | WO 2013/149223 | 10/2013 |
| WO | WO 2014/084325 | 6/2014 |

* cited by examiner

Docket No.: 3138-704.PCT.USF

| | CONVENTIONAL EXAMPLE | COMPARATIVE EXAMPLE | EXAMPLE 1 | EXAMPLE 2 |
|---|---|---|---|---|
| SHOULDER CIRCUMFERENTIAL MAIN GROOVE RAISED BOTTOM PORTION | NO | YES | YES | YES |
| SHOULDER LUG GROOVE RAISED BOTTOM PORTION | NO | YES | YES | YES |
| RECESSED PORTION AT INTERSECTION PORTION | NO | NO | YES | YES |
| H/D (0.1 TO 0.9) | - | - | 0.09 | 0.92 |
| RAISED BOTTOM HEIGHT OF RAISED BOTTOM PORTION | - | Sh CIRCUMFERENTIAL MAIN GROOVE = Sh LUG GROOVE | Sh CIRCUMFERENTIAL MAIN GROOVE = Sh LUG GROOVE | Sh CIRCUMFERENTIAL MAIN GROOVE = Sh LUG GROOVE |
| L2/L1 (0.1 TO 0.7) | - | - | 0.3 | 0.3 |
| WALL PORTION ANGLE OF RAISED BOTTOM PORTION | - | Sh CIRCUMFERENTIAL MAIN GROOVE = Sh LUG GROOVE | Sh CIRCUMFERENTIAL MAIN GROOVE = Sh LUG GROOVE | Sh CIRCUMFERENTIAL MAIN GROOVE = Sh LUG GROOVE |
| ANGLE OF WALL PORTION OF SHOULDER CIRCUMFERENTIAL MAIN GROOVE RAISED BOTTOM PORTION | - | LEADING SIDE = TRAILING SIDE | LEADING SIDE = TRAILING SIDE | LEADING SIDE = TRAILING SIDE |
| PERFORMANCE ON SNOW AND ICE | 100 | 95 | 100 | 98 |
| ROLLING RESISTANCE REDUCTION PERFORMANCE | 100 | 105 | 105 | 107 |
| NOISE PERFORMANCE | 100 | 100 | 105 | 107 |

FIG. 9A

| | EXAMPLE 3 | EXAMPLE 4 | EXAMPLE 5 | EXAMPLE 6 |
|---|---|---|---|---|
| SHOULDER CIRCUMFERENTIAL MAIN GROOVE RAISED BOTTOM PORTION | YES | YES | YES | YES |
| SHOULDER LUG GROOVE RAISED BOTTOM PORTION | YES | YES | YES | YES |
| RECESSED PORTION AT INTERSECTION PORTION | YES | YES | YES | YES |
| H/D (0.1 TO 0.9) | 0.1 | 0.5 | 0.5 | 0.5 |
| RAISED BOTTOM HEIGHT OF RAISED BOTTOM PORTION | Sh CIRCUMFERENTIAL MAIN GROOVE = Sh LUG GROOVE | Sh CIRCUMFERENTIAL MAIN GROOVE = Sh LUG GROOVE | Sh CIRCUMFERENTIAL MAIN GROOVE < Sh LUG GROOVE | Sh CIRCUMFERENTIAL MAIN GROOVE < Sh LUG GROOVE |
| L2/L1 (0.1 TO 0.7) | 0.3 | 0.3 | 0.08 | 0.8 |
| WALL PORTION ANGLE OF RAISED BOTTOM PORTION | Sh CIRCUMFERENTIAL MAIN GROOVE = Sh LUG GROOVE | Sh CIRCUMFERENTIAL MAIN GROOVE = Sh LUG GROOVE | Sh CIRCUMFERENTIAL MAIN GROOVE = Sh LUG GROOVE | Sh CIRCUMFERENTIAL MAIN GROOVE = Sh LUG GROOVE |
| ANGLE OF WALL PORTION OF SHOULDER CIRCUMFERENTIAL MAIN GROOVE RAISED BOTTOM PORTION | LEADING SIDE = TRAILING SIDE | LEADING SIDE = TRAILING SIDE | LEADING SIDE = TRAILING SIDE | LEADING SIDE = TRAILING SIDE |
| PERFORMANCE ON SNOW AND ICE | 101 | 105 | 103 | 106 |
| ROLLING RESISTANCE REDUCTION PERFORMANCE | 106 | 107 | 108 | 106 |
| NOISE PERFORMANCE | 106 | 107 | 106 | 107 |

FIG. 9B

|  | EXAMPLE 7 | EXAMPLE 8 | EXAMPLE 9 | EXAMPLE 10 |
|---|---|---|---|---|
| SHOULDER CIRCUMFERENTIAL MAIN GROOVE RAISED BOTTOM PORTION | YES | YES | YES | YES |
| SHOULDER LUG GROOVE RAISED BOTTOM PORTION | YES | YES | YES | YES |
| RECESSED PORTION AT INTERSECTION PORTION | YES | YES | YES | YES |
| H/D (0.1 TO 0.9) | 0.5 | 0.5 | 0.5 | 0.5 |
| RAISED BOTTOM HEIGHT OF RAISED BOTTOM PORTION | Sh CIRCUMFERENTIAL MAIN GROOVE < Sh LUG GROOVE | Sh CIRCUMFERENTIAL MAIN GROOVE < Sh LUG GROOVE | Sh CIRCUMFERENTIAL MAIN GROOVE < Sh LUG GROOVE | Sh CIRCUMFERENTIAL MAIN GROOVE < Sh LUG GROOVE |
| L2/L1 (0.1 TO 0.7) | 0.3 | 0.3 | 0.3 | 0.3 |
| WALL PORTION ANGLE OF RAISED BOTTOM PORTION | Sh CIRCUMFERENTIAL MAIN GROOVE = Sh LUG GROOVE | Sh CIRCUMFERENTIAL MAIN GROOVE > Sh LUG GROOVE | Sh CIRCUMFERENTIAL MAIN GROOVE > Sh LUG GROOVE | Sh CIRCUMFERENTIAL MAIN GROOVE > Sh LUG GROOVE |
| ANGLE OF WALL PORTION OF SHOULDER CIRCUMFERENTIAL MAIN GROOVE RAISED BOTTOM PORTION | LEADING SIDE = TRAILING SIDE | LEADING SIDE = TRAILING SIDE | LEADING SIDE > TRAILING SIDE | LEADING SIDE < TRAILING SIDE |
| PERFORMANCE ON SNOW AND ICE | 105 | 107 | 108 | 107 |
| ROLLING RESISTANCE REDUCTION PERFORMANCE | 107 | 107 | 107 | 107 |
| NOISE PERFORMANCE | 109 | 109 | 109 | 109 |

FIG. 9C

PNEUMATIC TIRE

TECHNICAL FIELD

The present technology relates to a pneumatic tire.

BACKGROUND ART

In a pneumatic tire, in order to discharge water between a tread surface and a road surface during running on wet road surfaces, a plurality of grooves are formed in the tread surface. Further, in a pneumatic tire that is provided with a tread pattern formed in a so-called block pattern and mounted on a drive shaft of a large vehicle such as a truck or a bus, snow traction performance (traction performance on snow) is of utmost importance. Thus, among the pneumatic tires in the related art, there are tires that achieve improved snow traction performance and improved performance on snow as a result of considerations made to the tread pattern.

For example, in the pneumatic tire described in Japan Unexamined Patent Publication No. 2015-13514, a shoulder land portion defined in a tire circumferential direction by a shoulder lateral groove extending in a tire lateral direction includes a shoulder subsidiary groove that extends in the tire circumferential direction, is connected to shoulder lateral grooves on both ends, and has a groove depth less than those of a shoulder main groove and a shoulder lug groove. Further, in this pneumatic tire, a middle subsidiary groove extending in the tire circumferential direction is formed in a middle land portion, and dimples are provided in a first middle land portion and a shoulder land portion positioned outward from the middle subsidiary groove of the middle land portion in the tire lateral direction, thereby making it possible to improve performance on snow while maintaining performance on ice.

In recent years there has been a demand for a reduction in pneumatic tire rolling resistance during vehicle running as well as a reduction in pass-by noise generated from a ground contact region of the pneumatic tire during vehicle running. To reduce rolling resistance, there exists a technique of raising a bottom of a groove formed on the tread surface and thus increase block rigidity, thereby reducing an energy loss caused by block deformation. However, when the bottom of a groove is raised, the groove volume decreases, which may cause a decrease in the amount of snow that can enter the groove and may cause a deterioration of snow traction performance. On the other hand, when the groove volume is increased to ensure snow traction performance, block rigidity is reduced, which may cause an increase in rolling resistance and may cause an increase in the amount of sound that flows through the grooves, making the sound readily to be emitted outside the ground contact region. As a result, noise may readily be generated. Therefore, reducing rolling resistance, improving snow traction performance, and reducing noise are interrelated and partially conflicting performance, thus making satisfaction of all these performance is extremely difficult.

SUMMARY

The present technology provides a pneumatic tire capable of reducing rolling resistance and noise while maintaining snow traction performance.

A pneumatic tire according to the present technology includes a plurality of circumferential main grooves formed on a tread surface and extending in a tire circumferential direction, a plurality of lug grooves formed on the tread surface and extending in a tire lateral direction, and a plurality of blocks wherein both sides of each of the blocks being defined by the lug grooves in the tire circumferential direction and at least one end portion of each of the blocks being defined by the circumferential main grooves in the tire lateral direction. Given, among the plurality of circumferential main grooves, the circumferential main grooves positioned most outward in the tire lateral direction as shoulder circumferential main grooves and, among the plurality of lug grooves, the lug grooves positioned outward from the shoulder circumferential main grooves in the tire lateral direction and connected to the shoulder circumferential main grooves from an outer side of the tire in the tire lateral direction as shoulder lug grooves, the shoulder circumferential main grooves and the shoulder lug grooves each includes a raised bottom portion on a groove bottom. The raised bottom portion is formed so as to exclude at least an intersection portion where the shoulder circumferential main groove and the shoulder lug groove intersect.

Further, in the pneumatic tire described above, preferably the raised bottom portions are configured so that a relationship between a raised bottom height H of the raised bottom portion and a maximum groove depth D of the shoulder circumferential main groove or the shoulder lug groove, where the raised bottom portion is formed, is within a range from $0.1 \leq (H/D) \leq 0.9$.

Further, in the pneumatic tire described above, preferably the raised bottom portions are formed so that the raised bottom height of the raised bottom portion formed on the shoulder lug groove is greater than the raised bottom height of the raised bottom portion formed on the shoulder circumferential main groove.

Further, in the pneumatic tire described above, given a position of a groove wall of the shoulder circumferential main groove facing an opening portion of the shoulder lug groove corresponding to the shoulder circumferential main groove as an end portion of the shoulder lug groove inward in the tire lateral direction, the raised bottom portion formed on the shoulder lug groove is configured so that a relationship between a distance L2 in the tire lateral direction from the end portion of the shoulder lug groove inward in the tire lateral direction to an end portion of the raised bottom portion inward in the tire lateral direction, and a distance L1 in the tire lateral direction from the end portion of the shoulder lug groove inward in the tire lateral direction to the end portion of the shoulder lug groove outward in the tire lateral direction is within a range from $0.1 \leq (L2/L1) \leq 0.7$.

Further, in the pneumatic tire described above, preferably the raised bottom portion is configured so that an angle, with respect to the tread surface, of each wall portion of an end portion of the raised bottom portion formed on the shoulder circumferential main groove in a direction of extension of the shoulder circumferential main groove is greater than an angle of, with respect to the tread surface, each wall portion of an end portion of the raised bottom portion formed on the shoulder lug groove in a direction of extension of the shoulder lug groove.

Further, in the pneumatic tire described above, preferably the pneumatic tire has a specified rotation direction, and the raised bottom portion formed on the shoulder circumferential main groove is configured so that an angle, with respect to the tread surface, of the wall portion on the end portion side on a trailing side in the tire rotation direction is greater than that of the wall portion on the end portion side on a leading side in the tire rotation direction.

Further, in the pneumatic tire described above, preferably the lug grooves are configured so that a plurality thereof are disposed in different positions in the tire lateral direction, and an inclination angle in the tire lateral direction with respect to the tire circumferential direction increases as the disposed position in the tire lateral direction increases in distance outward in the tire lateral direction from a center in the tire lateral direction.

Further, in the pneumatic tire described above, preferably the pneumatic tire has a specified rotation direction, the blocks are configured so that a plurality thereof are aligned in the tire circumferential direction, forming block rows, the tread surface is provided with a plurality of the block rows aligned in the tire lateral direction, and the blocks of at least the block row that, among the plurality of block rows, is closest to a tire equator line are each configured so that a groove wall of the lug groove defining the leading side of the block in the tire rotation direction has a greater angle on an inner portion side of the block with respect to the tread surface than a groove wall of the lug groove defining the trailing side of the block in the tire rotation direction.

Further, in the pneumatic tire described above, preferably the lug grooves are configured so that a plurality thereof are disposed in different positions in the tire lateral direction, and the shoulder lug grooves, among the plurality of lug grooves disposed in different positions in the tire lateral direction, have the greatest groove width.

Further, in the pneumatic tire described above, preferably the plurality of circumferential main grooves are configured so that given, among the plurality of circumferential main grooves, the circumferential main groove positioned on the tire equator line as a center circumferential main groove, the center circumferential main groove has the smallest groove width.

Further, in the pneumatic tire described above, preferably the raised bottom portions are formed on at least the center circumferential main groove and the shoulder circumferential main groove.

Further, in the pneumatic tire described above, preferably the blocks are configured so that a ratio of a length in the tire circumferential direction to a width in the tire lateral direction of the blocks positioned outward from the shoulder circumferential main grooves in the tire lateral direction is less than that of the blocks positioned inward from the shoulder circumferential main grooves in the tire lateral direction.

A pneumatic tire according to the present technology achieves the effect of reducing rolling resistance and noise while maintaining snow traction performance.

BRIEF DESCRIPTION OF DRAWINGS

FIG. 9A is a table showing the results of performance tests of pneumatic tires.

FIG. 9B is a table showing the results of performance tests of pneumatic tires.

FIG. 9C is a table showing the results of performance tests of pneumatic tires.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Further, "tire radial direction" refers to the direction orthogonal to the tire rotation axis. "Tire circumferential direction" refers to the direction of rotation with the tire rotation axis as the center of rotation.

Figure 1:
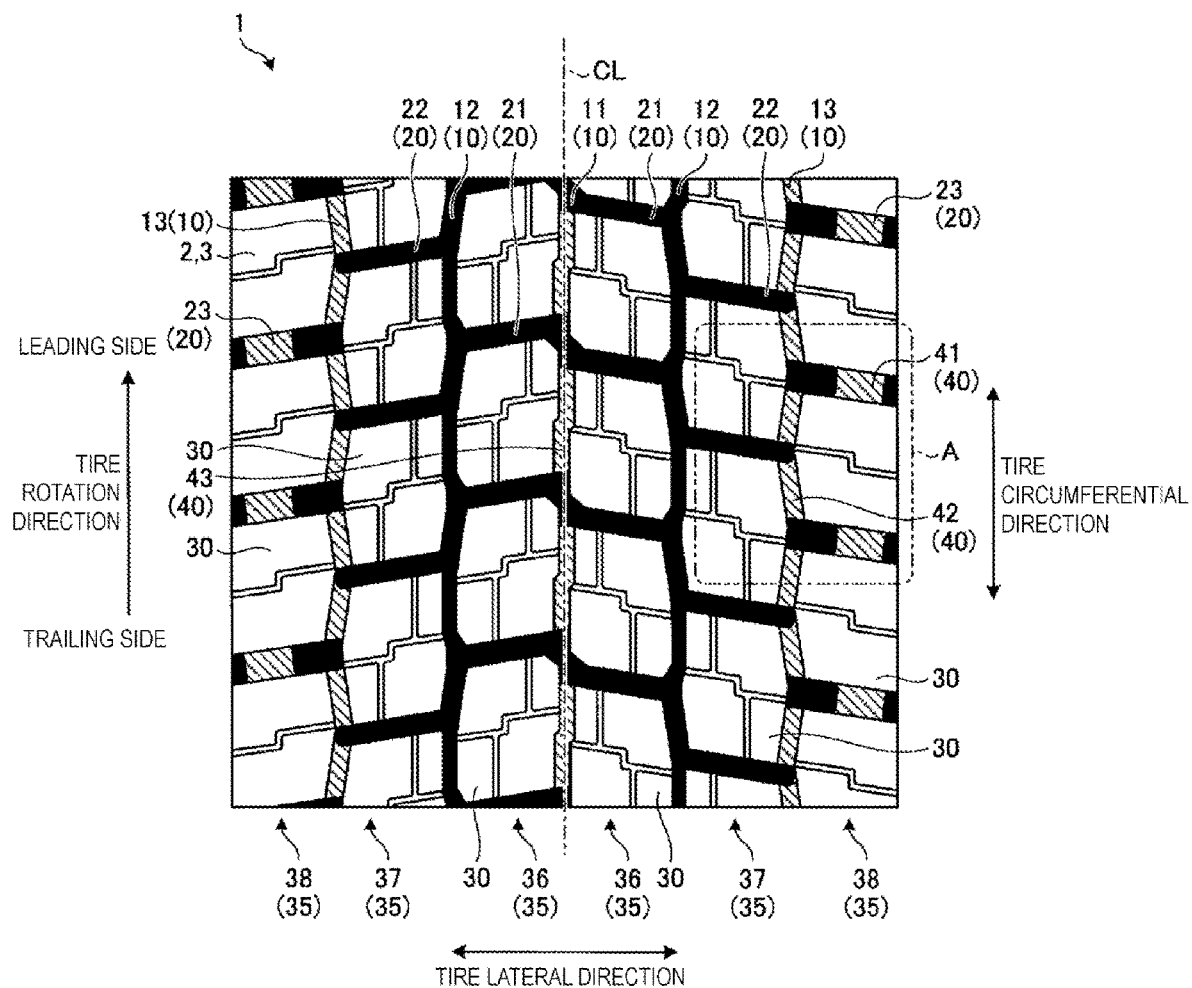
FIG. 1 is a plan view illustrating a tread surface of a pneumatic tire according to an embodiment.

FIG. 1 is a plan view of a tread surface of a pneumatic tire according to an embodiment. A pneumatic tire 1 illustrated in FIG. 1 is provided with a tread portion 2 in an outermost portion in the tire radial direction. The surface of the tread portion 2, i.e., the portion that contacts the road surface when a vehicle (not illustrated) mounted with the pneumatic tire 1 runs, is formed as a tread surface 3. A plurality of circumferential main grooves 10 extending in the tire circumferential direction and a plurality of lug grooves 20 extending in the tire lateral direction are each formed in the tread surface 3, and a plurality of blocks 30 serving as land portions are formed by the circumferential main grooves 10 and the lug grooves 20. That is, the blocks 30 are defined by the lug grooves 20 on both sides in the tire circumferential direction, and by the circumferential main grooves 10 on at least one end portion in the tire lateral direction, and thus each of the blocks 30 has a substantially quadrangular shape.

Specifically, five circumferential main grooves 10 are formed aligned in the tire lateral direction, each of the five circumferential main grooves 10 are formed with repeated bending in the tire lateral direction while extending in the tire circumferential direction. That is, the circumferential main grooves 10 extending in the tire circumferential direction are formed in a zigzag shape that oscillates in the tire lateral direction while extending in the tire circumferential direction. Among the five circumferential main grooves 10, the circumferential main groove 10 positioned in a center in the tire lateral direction is a center circumferential main groove 11, the two circumferential main grooves 10 positioned on both sides of the circumferential main groove 11 in the tire lateral direction adjacent to the center circumferential main groove 11 are middle circumferential main grooves 12, and the two circumferential main grooves 10 positioned most outward in the tire lateral direction are shoulder circumferential main grooves 13. These circumferential main grooves 10 are configured so that the center circumferential main groove 11 is positioned on a tire equator line CL, and thus one each of the middle circumferential main grooves 12 and the shoulder circumferential main grooves 13 are disposed on each side of the tire equator line CL in the tire lateral direction.

Further, the lug grooves 20 are configured so that the lug grooves 20 that do not penetrate the circumferential main groove 10 and are adjacent to each other via the circumferential main groove 10 are formed in positions that differ in the tire circumferential direction. That is, the plurality of lug grooves 20 are configured so that the lug grooves 20 connected from both sides in the tire lateral direction to the circumferential main grooves 10 differ in position in the tire circumferential direction. Further, among the lug grooves 20 positioned between the circumferential main grooves 10, the lug grooves 20 positioned between the center circumferential main groove 11 and the middle circumferential main grooves 12 are center lug grooves 21, the lug grooves 20 positioned between the middle circumferential main grooves 12 and the shoulder circumferential main grooves 13 adjacent to each other are middle lug grooves 22, and the lug grooves 20 positioned on outer sides of each of the shoulder circumferential main grooves 13 in the tire lateral direction are shoulder lug grooves 23. That is, a plurality of the lug grooves 20 are disposed in different positions in the tire lateral direction.

The circumferential main grooves 10 here have a groove width within a range from 3 to 10 mm, both inclusive, and a groove depth within a range from 7 to 25 mm, both inclusive. Further, the lug grooves 20 have a groove width within a range from 4 to 12 mm, both inclusive, and a groove depth within a range from 5 to 25 mm, both inclusive.

The blocks 30 defined by the circumferential main grooves 10 and the lug grooves 20 are disposed between the circumferential main grooves 10 adjacent to each other as well as on the outer side in the tire lateral direction of each of the two circumferential main grooves 10 positioned most outward in the tire lateral direction. Further, a plurality of the blocks 30 positioned in substantially the same position in the tire lateral direction are aligned in series in the tire circumferential direction via the lug grooves 20, forming block rows 35 each in a row shape. Such a block row 35 is formed in four locations between five circumferential main grooves 10, and in two locations outward in the tire lateral direction of the two circumferential main grooves 10 positioned most outward in the tire lateral direction, forming six rows in total.

Among the six block rows 35, the block rows 35 positioned between the center circumferential main groove 11 and the middle circumferential main grooves 12 are center block rows 36, the block rows 35 positioned between the middle circumferential main grooves 12 and the shoulder circumferential main grooves 13 adjacent to each other are middle block rows 37, and the block rows 35 positioned outward from each of the shoulder circumferential main grooves 13 in the tire lateral direction are shoulder block rows 38. That is, the center block rows 36 are the block rows 35 closest to the tire equator line CL, and the shoulder block rows 38 are the block rows 35 positioned most outward in the tire lateral direction. These six block rows 35 are aligned in the tire lateral direction on the tread surface 3. The tread pattern on the tread surface 3 of the pneumatic tire 1 according to the present embodiment is thus a so-called block pattern provided with land portions formed by the plurality of blocks 30.

Further, the pneumatic tire 1 according to the present embodiment has a specified rotation direction when mounted on a vehicle. In the description below, a leading side in the tire rotation direction is the rotation direction side when the pneumatic tire 1 rotates in the specified direction and, is the side that first contacts and first separates from the road surface when the pneumatic tire 1 is mounted on a vehicle, rotates in the specified direction, and runs. Further, a trailing side in the tire rotation direction is a side opposite to the rotation direction side when the pneumatic tire 1 rotates in the specified direction and, is the side that later contacts and separates from the road surface when the pneumatic tire 1 is mounted on a vehicle, rotates in the specified direction, and runs.

Each of the lug grooves 20 is inclined in a direction toward the trailing side in the tire rotation direction, as it goes from the tire equator line CL side to an outer side in the tire lateral direction. That is, the lug grooves 20 are each inclined in a direction toward the trailing side in the tire rotation direction, as it goes from an inner side toward the outer side in the tire lateral direction while extending in the tire circumferential direction. Further, the lug grooves 20 have inclination angles in the tire lateral direction with respect to the tire circumferential direction that increase as the disposed position in the tire lateral direction increases outward in distance in the tire lateral direction from a center in the tire lateral direction. That is, the middle lug groove 22 has an inclination angle in the tire lateral direction with respect to the tire circumferential direction that is greater than that of the center lug groove 21, and the shoulder lug groove 23 has an inclination angle in the tire lateral direction with respect to the tire circumferential direction that is greater than that of the middle lug groove 22. In other words, the lug grooves 20 have inclination angles in the tire circumferential direction with respect to the tire lateral direction that decrease as the disposed position in the tire lateral direction increases in distance outward in the tire lateral direction from the center in the tire lateral direction, the angle being close to the tire lateral direction.

Further, the lug grooves 20 are configured so that the center lug grooves 21, the middle lug grooves 22, and the shoulder lug grooves 23 each differ in groove width and, among the plurality of lug grooves 20 differing in position in the tire lateral direction, the shoulder lug grooves 23 have the greatest groove width. That is, the lug grooves 20 are configured so that the groove width of the shoulder lug grooves 23 is greater than the groove width of the center lug grooves 21.

Similarly, the circumferential main grooves 10 are also configured so that the center circumferential main groove 11, the middle circumferential main grooves 12, and the shoulder circumferential main grooves 13 each differ in groove width and, among the plurality of circumferential main grooves 10, the center circumferential main groove 11 positioned on the tire equator line CL has the smallest groove width. Specifically, the circumferential main grooves 10 are configured so that the groove width of the shoulder circumferential main grooves 13 is less than that of the middle circumferential main groove 12, and the groove width of the center circumferential main groove 11 is less than that of the shoulder circumferential main grooves 13.

Figure 2:
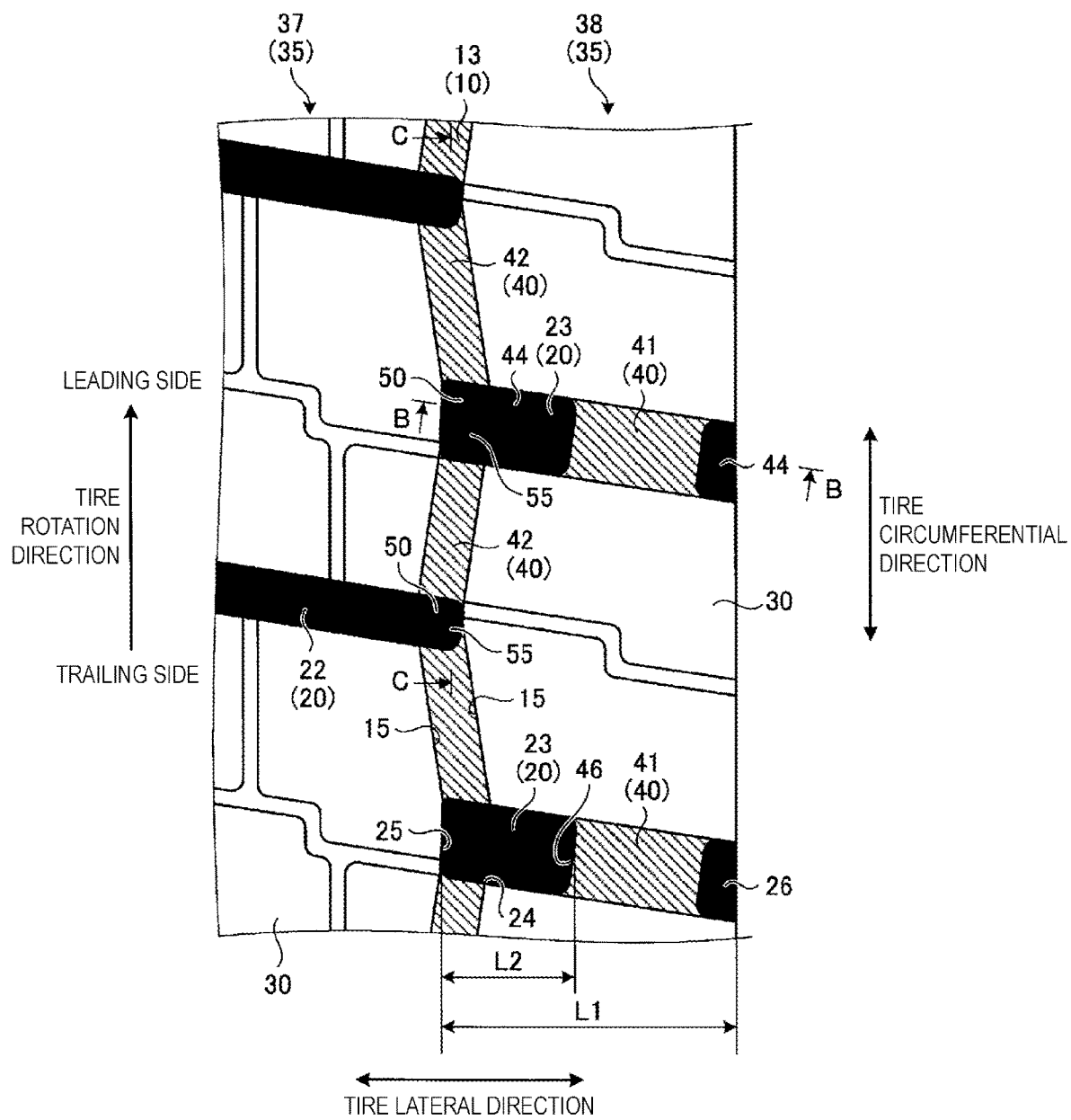
FIG. 2 is a detailed view of part A of FIG. 1.

FIG. 2 is a detailed view of part A of FIG. 1. The shoulder circumferential main grooves 13 and the shoulder lug grooves 23, which are the lug grooves 20 connected to the shoulder circumferential main grooves 13 from the outer side in the tire lateral direction, each include a raised bottom portion 40 formed on a groove bottom 44. This raised bottom portion 40 is formed excluding at least intersection portions 50 between the shoulder circumferential main grooves 13 and the shoulder lug grooves 23. The intersection portions 50 in this case are portions where the shoulder circumferential main grooves 13 and the shoulder lug grooves 23 overlap when the shoulder lug grooves 23 connected to the shoulder circumferential main grooves 13 from the outer side in the tire lateral direction extend to a groove wall 15 inward of the shoulder circumferential main groove 13 in the tire lateral direction.

The raised bottom portion 40 formed on the shoulder lug groove 23 is defined as a shoulder lug groove raised bottom portion 41, and the raised bottom portion 40 formed on the shoulder circumferential main groove 13 is defined as a shoulder circumferential main groove raised bottom portion 42. Both of them are not formed in the intersection portions 50, and the portions where the raised bottom portions 40 are not formed around a periphery of the intersection portions 50 are recessed portions 55. In other words, the raised bottom portions 40 are formed on both the shoulder circumferential main grooves 13 extending from the intersection portions 50 in the tire circumferential direction, and the shoulder lug grooves 23 extending outward from the intersection portions 50 in the tire lateral direction, and thus the portions where the raised bottom portions 40 are not formed in the regions of the intersection portions 50 are more recessed than the portions where the raised bottom portions 40 are formed. Thus, in the region in the vicinity of the intersection portions 50 between the shoulder circumferential main grooves 13 and the shoulder lug grooves 23, each portion where the raised bottom portion 40 is not formed is formed as the recessed portion 55 recessed in a greater degree than the portions where the raised bottom portions 40 are formed.

Specifically, the shoulder lug groove raised bottom portion 41 is formed across a range from a position separated from the intersection portion 50 at a predetermined interval outward in the tire lateral direction, to a position separated from an outer end portion 26 of the shoulder lug groove 23 in the tire lateral direction at a predetermined interval inward in the tire lateral direction. Further, the shoulder circumferential main groove raised bottom portions 42 are separated from one another by substantially the groove width of the shoulder lug groove 23 at a portion where the shoulder lug groove 23 is connected. In other words, in the portion of the shoulder circumferential main groove 13 where the shoulder lug groove 23 is connected, the shoulder circumferential main groove raised bottom portion 42 is not provided only at the position of the intersection portion 50 between the shoulder circumferential main groove 13 and the shoulder lug groove 23. Further, at the intersection portions 50 between the shoulder circumferential main grooves 13 and the middle lug grooves 22, the shoulder circumferential main groove raised bottom portions 42 are similarly not provided only at the positions of the intersection portions 50, and are separated from one another by substantially the groove width of the middle lug groove 22 at a portion where the middle lug groove 22 is connected. That is, the intersection portions 50 between the shoulder circumferential main grooves 13 and the middle lug grooves 22 are also formed as the recessed portion 55 where the raised bottom portion 40 is not provided.

Further, the shoulder lug groove raised bottom portions 41 are each configured so that the relationship between a distance L2 in the tire lateral direction from an inner end portion 25 of the shoulder lug groove 23 in the tire lateral direction to an inner end portion 46 of the shoulder lug groove raised bottom portion 41 in the tire lateral direction, and a distance L1 in the tire lateral direction from the inner end portion 25 of the shoulder lug groove 23 to the outer end portion 26 of the shoulder lug groove 23 in the tire lateral direction is within a range from $0.1 \leq (L2/L1) \leq 0.7$. The inner end portion 25 of the shoulder lug groove 23 in this case is in a position on the groove wall 15 of the shoulder circumferential main groove 13 facing an opening portion 24 of the shoulder lug groove 23 with respect to the shoulder circumferential main groove 13. In other words, the distances L1, L2 include the width of the intersection portion 50 in the tire lateral direction.

Note that the distance L2 in the tire lateral direction from the inner end portion 25 of the shoulder lug groove 23 to the inner end portion 46 of the shoulder lug groove raised bottom portion 41 with respect to the distance L1 in the tire lateral direction from the inner end portion 25 to the outer end portion 26 of the shoulder lug groove 23 is preferably within a range from $0.2 \leq (L2/L1) \leq 0.5$.

Figure 3:
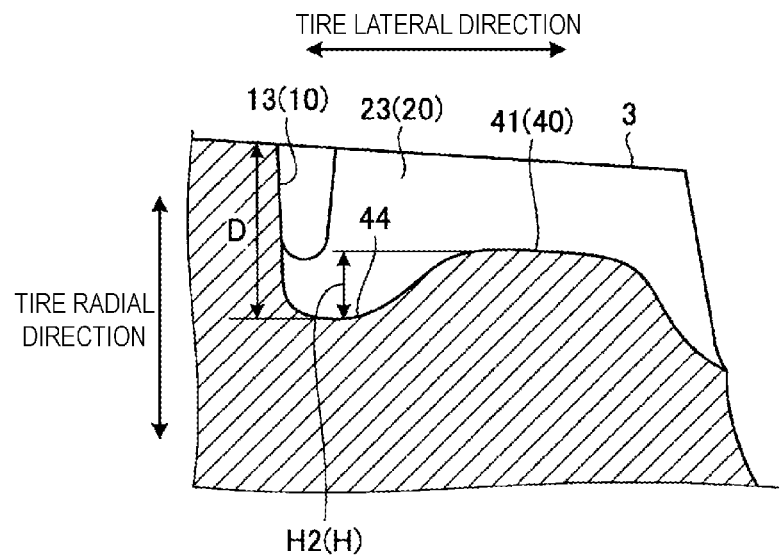
FIG. 3 is a cross-sectional view taken along B-B of FIG. 2.
Figure 4:
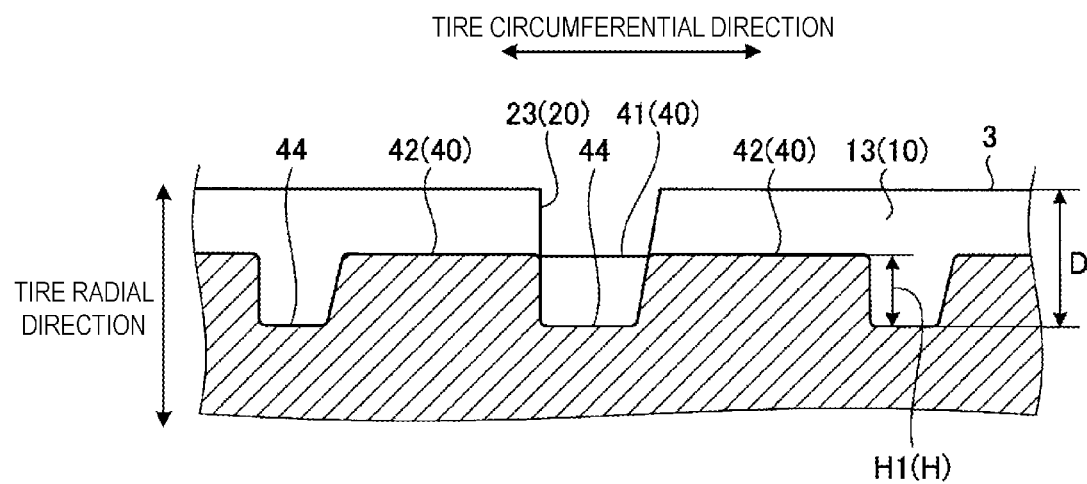
FIG. 4 is a cross-sectional view taken along C-C of FIG. 2.

FIG. 3 is a cross-sectional view taken along B-B of FIG. 2. FIG. 4 is a cross-sectional view taken along C-C of FIG. 2. The raised bottom portions 40 are configured so that the relationship between a raised bottom height H from the groove bottom 44 of the shoulder circumferential main groove 13 and the shoulder lug groove 23 and a maximum groove depth D of the shoulder circumferential main groove 13 or the shoulder lug groove 23 where the raised bottom portion 40 is formed is within a range from $0.1 \leq (H/D) \leq 0.9$. The maximum groove depth D in this case is the groove depth that, among the groove depths corresponding to a distance in the tire radial direction from the tread surface 3 to the respective groove bottoms 44 of the shoulder circumferential main groove 13 and the shoulder lug groove 23, is the groove depth of each portion having the greatest distance in the tire radial direction of the shoulder circumferential main groove 13 and the shoulder lug groove 23 respectively. That is, the shoulder lug groove raised bottom portion 41 is configured so that the raised bottom height H with respect to the maximum groove depth D of the shoulder lug groove 23 is within a range from $0.1 \leq (H/D) \leq 0.9$. Similarly, the shoulder circumferential main groove raised bottom portion 42 is configured so that the raised bottom height H with respect to the maximum groove depth D of the shoulder circumferential main groove raised 13 is within the range from $0.1 \leq (H/D) \leq 0.9$.

Further, the raised bottom portions 40 are formed so that a raised bottom height H2 of the shoulder lug groove raised bottom portion 41 is greater than a raised bottom height H1 of the shoulder circumferential main groove raised bottom portion 42. Thus, the raised bottom portions 40 are configured so that both the shoulder lug groove raised bottom portion 41 and the shoulder circumferential main groove raised bottom portion 42 have a raised bottom height H with respect to the maximum groove depth D of the shoulder circumferential main groove 13 or the shoulder lug groove 23 that is within the range from $0.1 \leq (H/D) \leq 0.9$, and the raised bottom height H2 of the shoulder lug groove raised bottom portion 41 is greater than the raised bottom height H1 of the shoulder circumferential main groove raised bottom portion 42.

Note that the raised bottom height H of raised bottom portion 40 with respect to the maximum groove depth D of the shoulder circumferential main groove 13 and the shoulder lug groove 23 is preferably within a range from $0.3 \leq (H/D) \leq 0.5$.

Figure 5:
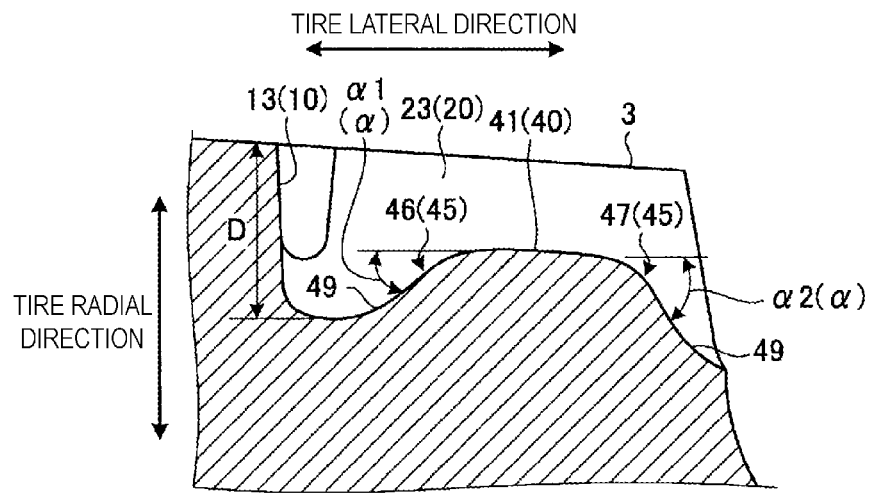
FIG. 5 is an explanatory diagram of angles of a wall portion of a shoulder lug groove raised bottom portion.
Figure 6:
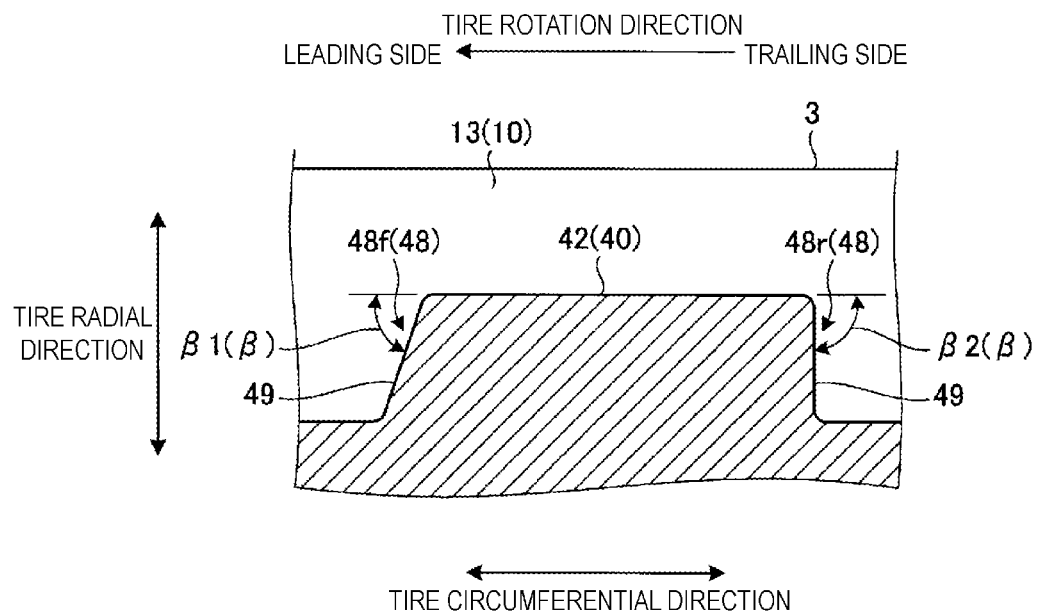
FIG. 6 is an explanatory diagram of angles of a wall portion of a shoulder circumferential main groove raised bottom portion.

FIG. 5 is an explanatory diagram of angles of a wall portion of the shoulder lug groove raised bottom portion 41. FIG. 6 is an explanatory diagram of angles of a wall portion of the shoulder circumferential main groove raised bottom portion 42. The raised bottom portion 40 is configured so that angles β, with respect to the tread surface 3, of a wall portion 49 of shoulder circumferential main groove raised bottom end portions 48, which are end portions of the shoulder circumferential main groove raised bottom portion 42 is greater than angles α, with respect to the tread surface 3, of the wall portion 49 of shoulder lug groove raised bottom end portions 45, which are end portions of the shoulder lug groove raised bottom portion 41. The shoulder lug groove raised bottom end portions 45 in this case are both end portions of the shoulder lug groove raised bottom portion 41 in a direction of extension of the shoulder lug groove 23, and the shoulder circumferential main groove raised bottom end portions 48 are both end portions of the shoulder circumferential main groove raised bottom portion 42 in a direction of extension of the shoulder circumferential main groove 13.

Note that, in FIGS. 5 and 6, a top face of the raised bottom portion 40 is illustrated as being parallel with the tread surface 3, and the angles α and β are illustrated as the angles of the wall portion 49 of the raised bottom portion 40 with respect to the top surface of the raised bottom portion 40.

Further, the shoulder lug groove raised bottom portions 41 are configured so that an angle α2, with respect to the tread surface 3, of the wall portion 49 of, among the shoulder lug groove raised bottom end portions 45 on both sides in the tire lateral direction, the outer end portion 47 in the tire lateral direction is greater than an angle α1, with respect to the tread surface 3 of the wall portion 49 of the inner end portion 46 in the tire lateral direction. That is, the shoulder lug groove raised bottom portion 41 is configured so that the wall portion 49 of the inner end portion 46 has a gentler incline than the wall portion 49 of the outer end portion 47.

Further, the shoulder circumferential main groove raised bottom portions 42 are configured so that the wall portion 49 on the side of a trailing end portion 48r, which is, among the shoulder circumferential main groove raised bottom end portions 48 on both sides in the tire circumferential direction, an end portion on the trailing side in the tire rotation direction, has a greater angle β with respect to the tread surface 3 than the wall portion 49 of the side of a leading end portion 48f, which is an end portion on the leading side in the tire rotation direction. That is, the shoulder circumferential main groove raised bottom portions 42 are configured so that an angle β2 of the wall portion 49 on the trailing end portion 48r side with respect to the tread surface 3 is greater than an angle β1 of the wall portion 49 on the leading side portion 48f side with respect to the tread surface 3, and the wall portion 49 on the trailing end portion 48r side is sheerer than the wall portion 49 on the leading end portion 48f side.

Figure 7:
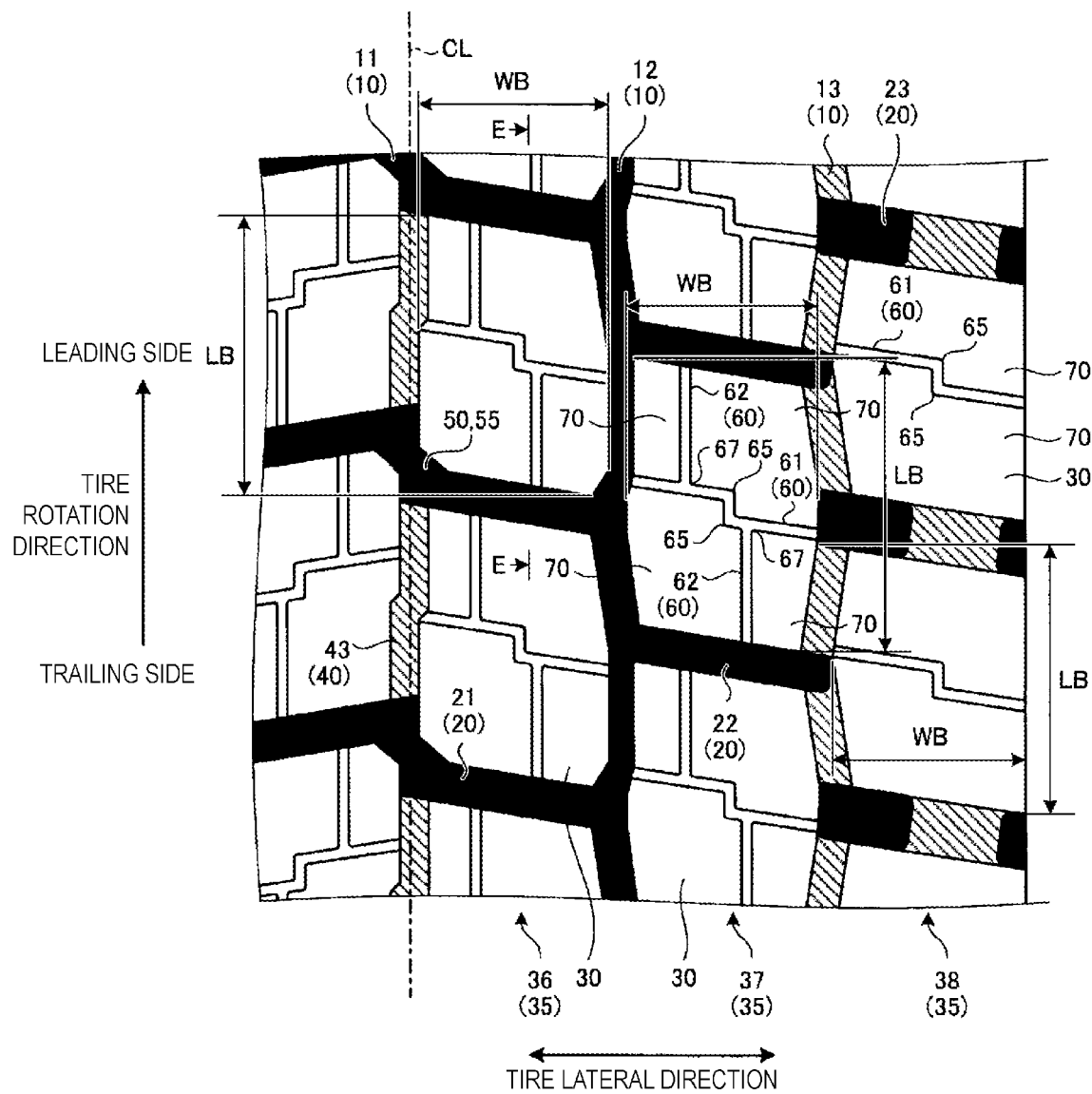
FIG. 7 is an explanatory diagram of blocks of each block row.

FIG. 7 is an explanatory diagram of the blocks of each block row. The blocks 30 are configured so that a ratio of a length LB in the tire circumferential direction to a width WB in the tire lateral direction of the blocks 30 of the shoulder block rows 38 positioned outward from the shoulder circumferential main grooves 13 in the tire lateral direction is less than that of the blocks 30 of the center block rows 36 and the middle block rows 37 positioned inward from the shoulder circumferential main grooves 13 in the tire lateral direction. Specifically, the relationship of the ratios of the length LB in the tire circumferential direction to the width WB in the tire lateral direction of the blocks 30 is such that the ratio of the blocks 30 of the middle block rows 37> the ratio of the blocks 30 of the center block rows 36> the ratio of the blocks 30 of the shoulder block rows 38.

That is, each of the blocks 30 is formed into a substantially rectangular shape in which the length LB in the tire circumferential direction is greater than the width WB in the tire lateral direction. Among the blocks 30, the blocks 30 of the middle block rows 37 have the greatest difference between the length LB in the tire circumferential direction and the width WB in the tire lateral direction, and the blocks 30 of the shoulder block rows 38 have the smallest difference between the length LB in the tire circumferential direction and the width WB in the tire lateral direction.

Further, the raised bottom portions 40 formed in the circumferential main grooves 10 are formed in the shoulder circumferential main grooves 13 as well as the center circumferential main groove 11. As with the center circumferential main groove raised bottom portions 42, center circumferential main groove raised bottom portions 43, which are the raised bottom portions 40 formed in the center circumferential main groove 11, are formed excluding the intersection portions 50 between the center lug grooves 21 and the center circumferential main groove 11. That is, the intersection portions 50 between the center circumferential main groove 11 and the center lug grooves 21 include the recessed portions 55 where the center circumferential main groove raised bottom portion 43 is not formed.

Further, the blocks 30 include narrow grooves 60. In the center block rows 36 and the middle block rows 37 among the six block rows 35, the narrow grooves 60 open to the circumferential main grooves 10 and the lug grooves 20 that define the blocks 30. Further, in the shoulder block rows 38, the narrow grooves 60 open to the shoulder circumferential main grooves 13 that define the blocks 30 as well as to the outer sides of the blocks 30 in the tire lateral direction. Further, the narrow grooves 60 are each formed in substantially the same form in each of the blocks 30, to the blocks 30 of the center block rows 36 and the middle block rows 37, and in substantially the same form in each of the blocks 30, to the blocks 30 of the shoulder block rows 38.

Here, the narrow grooves 60 each have a groove width within a range from 1 to 2 mm, both inclusive, and a groove depth within a range from 1 to 15 mm, both inclusive, and include a sipe. Here, "sipe" refers to a groove formed into a narrow shape in the tread surface 3. When the pneumatic tire 1 is mounted on a regular rim, inflated to a regular internal pressure, and placed under no load conditions, wall surfaces constituting the sipe do not come into contact with each other. When the sipe is positioned in a portion of a ground contact surface formed on a flat plate with a load applied in a vertical direction on the plate, or when the block 30 where the sipe is formed collapses, the wall surfaces constituting the sipe, or at least portions of areas disposed on the wall surfaces, come into contact with each other as a result of deformation of the block 30. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to "maximum air pressure" defined by JATMA, a maximum value given in "Tire Load Limits at Various Cold Inflation Pressures" defined by TRA, or "Inflation Pressures" defined by ETRTO. The narrow grooves 60 in the present embodiment, include such a sipe as well as such grooves that maintain a state in which the groove walls are separated from each other even when positioned on the ground contact surface.

Specifically, in the blocks 30 constituting the center block rows 36 and the middle block rows 37, the narrow grooves 60 include a lateral narrow groove 61 extending in the tire lateral direction, and a circumferential narrow groove 62 extending in the tire circumferential direction. Among these grooves, the lateral narrow groove 61 opens to the circumferential main grooves 10 defining both sides of the block 30 in the tire lateral direction. Further, the circumferential narrow groove 62 has at least one end that opens to the lug grooves 20 defining the block 30.

Further, the lateral narrow groove 61 bends at two locations while extending in the tire lateral direction, and includes two bent portions 65. The two bent portions 65 bend in directions such that the portion of the lateral narrow groove 61 positioned outward from the bent portion 65 in the tire lateral direction is positioned further on the trailing side in the tire rotation direction than the portion of the lateral narrow groove 61 positioned inward from the bent portion 65 in the tire lateral direction. These two bent portions 65 are positioned in a central region of the block 30 in the tire lateral direction and at different positions in the tire circumferential direction, and the portion of the lateral narrow groove 61 between the bent portions 65 extends in the tire circumferential direction at a short length. In other words, the lateral narrow groove 61 bends at the two bent portions 65, forming a so-called crank-like shape.

Further, the circumferential narrow groove 62 is provided in two numbers, and these two circumferential narrow grooves 62 are positioned further outward in the tire lateral direction than the bent portions 65 of the lateral narrow groove 61 in the block 30. That is, among the two circumferential narrow grooves 62, one circumferential narrow groove 62 is positioned inward from the bent portions 65 in the tire lateral direction, and the other circumferential narrow groove 62 is positioned outward from the bent portions 65 in the tire lateral direction. Among these grooves, the circumferential narrow groove 62 positioned inward from the bent portions 65 in the tire lateral direction is positioned on the leading side from the lateral narrow groove 61 in the tire rotation direction, and the circumferential narrow groove 62 positioned outward from the bent portions 65 in the tire lateral direction is positioned on the trailing side from the lateral narrow groove 61 in the tire rotation direction.

The circumferential narrow grooves 62, at these positions, are each configured so that one end opens to the lug groove 20, and the other end intersects the lateral narrow groove 61, connecting and opening to the lateral narrow groove 61. Specifically, the circumferential narrow groove 62 positioned inward from the bent portions 65 in the tire lateral direction is configured so that an end portion on the leading side in the tire rotation direction opens to the lug groove 20, and an end portion on the trailing side in the tire rotation direction is connected to the lateral narrow groove 61. Further, the circumferential narrow groove 62 positioned outward from the bent portions 65 in the tire lateral direction is configured so that an end portion on the trailing side in the tire rotation direction opens to the lug groove 20, and an end portion on the leading side in the tire rotation direction is connected to the lateral narrow groove 61.

A portion where the circumferential narrow groove 62 and the lateral narrow groove 61 intersect forms an intersection point 67, and the narrow grooves 60 include two intersection points 67 formed by the two circumferential narrow grooves 62 intersecting one lateral narrow groove 61. That is, two circumferential narrow grooves 62, each of which is one narrow groove 60, are provided, and these two circumferential narrow grooves 62 intersect the lateral narrow groove 61, which is another narrow groove 60, resulting in two intersection points 67 in the narrow grooves 60. The bent portions 65 of the lateral narrow groove 61 are positioned between the two intersection points 67 in the tire lateral direction.

Each of the blocks 30 constituting the center block rows 36 and the middle block rows 37 is partitioned into four small blocks 70 by the narrow grooves 60 thus formed. That is, the lateral narrow groove 61 and the circumferential narrow grooves 62 of the narrow grooves 60 are connected to the circumferential main grooves 10 and the lug grooves 20, and the lateral narrow groove 61 and the circumferential narrow grooves 62 are connected to each other. Thus, the blocks 30 are divided into a plurality of regions in a plan view by the narrow grooves 60, each region being a small block 70.

Further, in the blocks 30 constituting the shoulder block rows 38, the circumferential narrow groove 62 is not formed, and only the lateral narrow groove 61 including the two bent portions 65 and extending in the tire lateral direction are formed as the narrow groove 60. In this way, the blocks 30 constituting the shoulder block rows 38 are partitioned into two small blocks 70.

Figure 8:
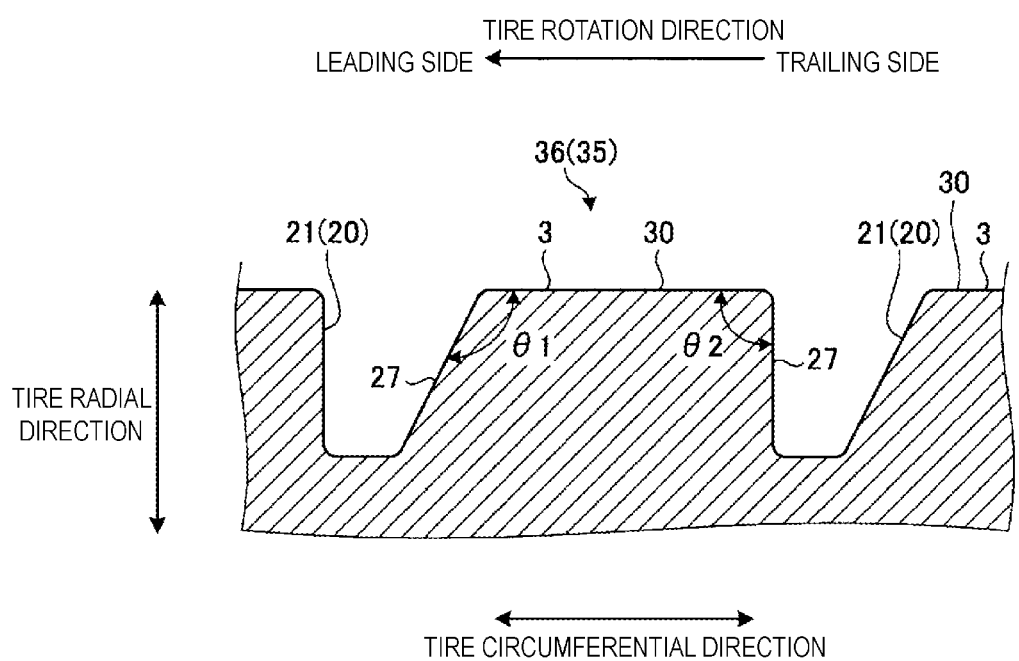
FIG. 8 is a cross-sectional view taken along E-E of FIG. 7.

FIG. 8 is a cross-sectional view taken along E-E of FIG. 7. The blocks 30 of, among the plurality of the block rows 35, at least the center block rows 36 are each configured so that a groove wall 27 of the lug groove 20 defining the leading side of the block 30 in the tire rotation direction has a greater angle on an inner portion side of the block 30 with respect to the tread surface 3 than the groove wall 27 of the lug groove 20 defining the trailing side of the block 30 in the tire rotation direction. That is, the blocks 30 of the center block rows 36 are each configured so that an angle $\theta1$ on the inner portion side of the block 30 formed by the tread surface 3 and the groove wall 27 of the center lug groove 21 defining the leading side of the block 30 in the tire rotation direction is greater than an angle $\theta2$ on the inner portion side of the block 30 formed by the tread surface 3 and the groove wall 27 of the center lug groove 21 defining the trailing side of the block 30 in the tire rotation direction.

The pneumatic tire 1 according to the present embodiment thus configured is applied to a heavy duty pneumatic tire. When mounted on a vehicle, the pneumatic tire 1 is mounted on a rim wheel and then mounted with the rim on the vehicle in an inflated state. The pneumatic tire 1 mounted on the rim wheel is mounted on a large vehicle such as a truck or a bus, for example.

When a vehicle with the pneumatic tire 1 mounted thereon runs, the pneumatic tire 1 rotates while the tread surface 3 of the tread surface 3 located at the bottom contacts the road surface. When a vehicle with the pneumatic tire 1 mounted thereon runs on dry road surfaces, the vehicle runs mainly by a friction force between the tread surface 3 and the road surface. This friction force transmits a driving force and a braking force to the road surface and generates a swivel force. Further, when the vehicle runs on wet road surfaces, the vehicle runs while water between the tread surface 3 and the road surface enters the circumferential main grooves 10, the lug grooves 20, and the like, and is discharged by these grooves. In this way, the tread surface 3 readily contacts the road surface, allowing the vehicle to run by the friction force between the tread surface 3 and the road surface.

Here, this kind of grooves tend to decrease the rigidity of the block 30 defined by the grooves. When a block rigidity decreases, energy is consumed by deformation of the block 30 as the pneumatic tire 1 rolls, resulting in an increase in rolling resistance. In contrast, in the pneumatic tire 1 according to the present embodiment, the raised bottom portions 40 are formed on the groove bottoms 44 of the shoulder circumferential main grooves 13 and the shoulder lug grooves 23. Accordingly, the block rigidity of the blocks 30 adjacent to the shoulder circumferential main grooves 13 and the shoulder lug grooves 23 can be improved, and the energy loss caused by deformation of the blocks 30 during vehicle running can be reduced. Thus, rolling resistance during the rolling of the pneumatic tire 1 can be reduced.

Further, when the vehicle runs on icy and snowy road surfaces, the edges serving as boundary portions between the tread surface 3 and the grooves get caught on the icy and snowy road surfaces, making it possible to generate resistance between the tread surface 3 and the icy and snowy road surfaces and generate traction. Additionally, in the pneumatic tire 1 according to the present embodiment, the narrow grooves 60 are formed in the blocks 30, dividing the blocks 30 into a plurality of the small blocks 70. Accordingly, the number of edge components of each of the blocks 30 increases and the number of edge components of the tread surface 3 in its entirety increases, making it possible to ensure traction performance as well as performance on snow and ice during running on icy and snowy road surfaces.

Further, when the vehicle runs on snow-covered road surfaces, the pneumatic tire 1 presses together the snow on the road surface using the tread surface 3. Further, the snow on the road surface enters the circumferential main grooves 10 and the lug grooves 20, and thus this snow is pressed together in the grooves as well. In this state, a driving force or a braking force as well as a force in the tire lateral direction by the turning of the vehicle act on the pneumatic tire 1, generating a so-called snow column shear force, which is a shear force that acts on the snow in the grooves. This snow column shear force then generates resistance between the pneumatic tire 1 and the road surface, making it possible to transfer the driving force or braking force to the snow-covered road surfaces and thus allow the vehicle to run on snow-covered road surfaces.

However, when the raised bottom portions 40 are provided to the circumferential main grooves 10 and the lug grooves 20, the amount of snow that enters the grooves decreases, making it difficult to achieve the snow column shear force. In contrast, in the pneumatic tire 1 according to the present embodiment, the raised bottom portions 40 are not provided to the intersection portions 50 between the shoulder circumferential main grooves 13 and the shoulder lug grooves 23, forming as the recessed portions 55. Thus, periodic recesses/protrusions can be formed by the raised bottom portions 40 and the recessed portions 55 on the groove bottoms 44 of the circumferential main grooves 10, making it possible to ensure snow column shear force. In this way, the pneumatic tire 1 can transfer driving force and braking force to the snow-covered road surfaces, making it possible to ensure snow traction performance while improving block rigidity by the raised bottom portions 40.

Further, a hitting sound is generated when the tread surface 3 contacts the ground while the pneumatic tire 1 is rolling, and this sound turns into noise when emitted through the circumferential main grooves 10 and the lug grooves 20 and outward from the ground contact region of the tread surface 3 with respect to the road surface. Thus, in response to sound that passes through the circumferential main grooves 10 and the lug grooves 20, the pneumatic tire 1 according to the present embodiment is provided with the recessed portions 55 at the intersection portions 50 between the shoulder circumferential main grooves 13 and the shoulder lug grooves 23, making it possible to confine the sound to the recessed portions 55. That is, the recessed portions 55 are spaces surrounded by not only the groove walls of the circumferential main grooves 10 and the lug grooves 20, but also the raised bottom portions 40, making it difficult for sound that flows into the recessed portions 55 to leave the recessed portions 55. Accordingly, the recessed portions 55 make it less likely for the sound that flows into the recessed portions 55 to escape outward from the ground contact region, thereby improving noise reduction. As a result, it is possible to reduce rolling resistance and noise while maintaining snow traction performance.

Further, the raised bottom portions 40 are each configured so that the relationship between the raised bottom height H of the raised bottom portion 40 and the maximum groove depth D of the shoulder circumferential main groove 13 or the shoulder lug groove 23 where the raised bottom portion 40 is formed is within the range from $0.1 \leq (H/D) \leq 0.9$, making it possible to more reliably ensure snow column shear force while maintaining block rigidity. That is, when the relationship between the raised bottom height H of the raised bottom portion 40 and the maximum groove depth D is $H<0.1$, the raised bottom height H of the raised bottom portion 40 is too low with respect to the maximum groove depth D, possibly causing difficulties in ensuring block rigidity even when the raised bottom portion 40 is provided. In this case, it may be difficult to effectively reduce rolling resistance. Further, when the relationship between the raised bottom height H of the raised bottom portion 40 and the maximum groove depth D is $H>0.9$, the raised bottom height H of the raised bottom portion 40 is too high with respect to the maximum groove depth D, resulting in a reduction in groove volume, and thus possibly causing a reduction in the amount of snow that enters the shoulder circumferential main groove 13 and the shoulder lug groove 23. In this case, snow column shear force becomes more difficult to ensure by the shoulder circumferential main grooves 13 and the shoulder lug grooves 23, possibly causing difficulties in ensuring snow traction performance. In contrast, when the relationship between the raised bottom height H of the raised bottom portion 40 and the maximum groove depth D is within the range from $0.1 \leq (H/D) \leq 0.9$, both block rigidity and snow column shear force can be more reliably ensured. As a result, it is possible to more reliably reduce rolling resistance and noise while maintaining snow traction performance.

Further, the raised bottom portions 40 are formed so that the raised bottom height H2 of the shoulder lug groove raised bottom portion 41 is greater than the raised bottom height H1 of the shoulder circumferential main groove raised bottom portion 42, making it more reliably possible to suppress the sound generated when the tread surface 3 contacts the ground from traveling through the shoulder lug groove 23 and escaping outward in the tire lateral direction by the shoulder lug groove raised bottom portion 41. As a result, noise reduction can be more reliably reduced.

Further, the relationship between the distance L2 in the tire lateral direction from the inner end portion 25 of the shoulder lug groove 23 to the inner end portion 46 of the shoulder lug groove raised bottom portion 41, and a distance L1 in the tire lateral direction from the inner end portion 25 of the shoulder lug groove 23 to the outer end portion 26 of the shoulder lug groove 23 is within the range from $0.1 \leq (L2/L1) \leq 0.7$, making it possible to more reliably ensure block rigidity while maintaining snow traction performance. In other words, when the relationship between the distance L1 and the distance L2 is $(L2/L1)<0.1$, the width of the recessed portion 55 in the tire lateral direction is too small, decreasing the amount of snow that enters the recessed portion 55 and possibly causing difficulties in maintaining snow traction performance. Further, when the relationship between the distance L1 and the distance L2 is $(L2/L1)>0.7$, the width of the shoulder lug groove raised bottom portion 41 in the tire lateral direction is too small, possibly causing difficulties in ensuring block rigidity by the shoulder lug groove raised bottom portion 41. In this case, it may be difficult to effectively reduce rolling resistance. In contrast, when the relationship between the distance L1 and the distance L2 is within the range from 0.1≤(L2/L1)≤0.7, the width of the recessed portion 55 is ensured, making it possible to ensure the amount of snow that can enter the recessed portion 55 and more reliably ensure block rigidity by the shoulder lug groove raised bottom portion 41 while maintaining snow traction performance by the snow column shear force. As a result, it is possible to more reliably reduce rolling resistance while maintaining snow traction performance.

Further, the angle β, with respect to the tread surface 3, of the wall portion 49 of the shoulder circumferential main groove raised bottom portion 48 is greater than the angle α, with respect to the tread surface 3, of the wall portion 49 of the shoulder lug groove raised bottom end portion 45, making it possible to more reliably exhibit a large snow column shear force by the shoulder circumferential main groove raised bottom portion 42 with respect to the snow that enters the shoulder circumferential main grooves 13. In this way, a greater resistance to the snow on the road surface in the tire circumferential direction can be generated during running on snow-covered road surfaces, making it possible to more readily transfer driving force and braking force to snow-covered road surfaces. As a result, snow traction performance can be more reliably improved.

Further, the shoulder circumferential main groove raised bottom portions 42 are configured so that the wall portion 49 on the trailing end portion 48r side has a greater angle β with respect to the tread surface 3 than the wall portion 49 on the leading end portion 48f side, thereby making it possible to improve snow column shear force on the trailing end portion 48r side. In this way, the snow traction performance in the direction of transfer of braking force to the road surface during running on snow-covered road surfaces can be improved. As a result, braking performance on snow can be improved.

Further, the lug grooves 20 have inclination angles in the tire lateral direction with respect to the tire circumferential direction that increase as the disposed position in the tire lateral direction increases outward in distance in the tire lateral direction from the center in the tire lateral direction, thereby making it possible to more reliably improve noise reduction while maintaining snow traction performance and further improve drainage performance. That is, during braking of the vehicle, the ground contact length near both ends in the tire lateral direction extends and thus the edge components in the tire circumferential direction by the grooves are ensured near both ends in the tire lateral direction, making expectations of improvement in snow traction performance by the edge effect possible. Thus, the inclination angles in the tire lateral direction with respect to the tire circumferential direction of the lug grooves 20 positioned near both sides in the tire lateral direction are increased, increasing the edge components in the tire circumferential direction near both sides in the tire lateral direction and thus making it possible to improve the snow traction performance during braking on snow-covered road surfaces.

Further, under normal running conditions, the ground contact pressure in the central region in the tire lateral direction increases, increasing the likelihood that the hitting sound generated during ground contact by the blocks 30 will increase in volume in the central region in the tire lateral direction. In contrast, when the inclination angle in the tire lateral direction with respect to the tire circumferential direction of the lug grooves 20 positioned in the central region in the tire lateral direction is decreased, the blocks 30 can gradually contact the ground when the tread surface 3 contacts the ground in this region, making it possible to reduce the volume of the hitting sound generated when the blocks 30 contact the ground. In this way, the noise generated during the rolling of the pneumatic tire 1 can be reduced.

Furthermore, the inclination angles in the tire lateral direction with respect to the tire circumferential direction of the lug grooves 20 that are positioned in the central region in the tire lateral direction and have a ground contact length that increases under normal running conditions are decreased, making it possible to improve drainage performance. That is, the drainage performance of lug grooves 20 is as below. With a decrease in the inclination angles in the tire lateral direction with respect to the tire circumferential direction of the lug grooves 20, water that enters the lug grooves 20 as the pneumatic tire 1 rolls can readily escape in the tire lateral direction, making it possible to improve the drainage performance of the lug grooves 20. Thus, with the decrease in the inclination angles of the lug grooves 20 in a region with a long ground contact length, drainage performance in the region that readily contacts the ground under normal running conditions can be improved, making it possible to improve the drainage performance of the pneumatic tire 1 in its entirety. This makes it possible to more reliably reduce noise while maintaining snow traction performance, and further improve drainage performance.

Further, the angle θ1 of the groove wall 27 of each of the center lug grooves 21 defining the leading side of the blocks 30 of the center block rows 36 in the tire rotation direction is greater than the angle θ2 of the groove wall 27 of each of the center lug grooves 21 defining the trailing side of the blocks 30 in the tire rotation direction, making it possible to reduce the deformation when the blocks 30 of the center block rows 36 contact the ground. The center block rows 36 have high ground contact pressure under normal running conditions compared to that of the other block rows 35 and thus, with suppression of the deformation of the blocks 30 in the region having high ground contact pressure, rolling resistance can be more reliably reduced. Further, in the center block rows 36, while a loud hitting sound readily occurs in association with the high ground contact pressure under normal running conditions, the reduction in the deformation upon ground contact by the blocks 30 of the center block rows 36 makes it possible to reduce the volume of the hitting sound. In this way, the noise generated during the rolling of the pneumatic tire 1 can be reduced. Furthermore, the angle θ2 of the groove wall 27 of each of the center lug grooves 21 defining the trailing side of the blocks 30 of the center block rows 36 in the tire rotation direction is reduced, and thus the groove wall 27 on the trailing side in the tire rotation direction is sheer, making it possible to improve the snow column shear force on the trailing side of the blocks 30 in the tire rotation direction. In this way, the snow traction performance in the direction of transfer of braking force to the road surface during running on snow-covered road surfaces can be improved. This makes it possible to more reliably reduce rolling resistance and noise while maintaining snow traction performance.

Further, among the lug grooves 20, the shoulder lug grooves 23 have the greatest groove width, making it possible to ensure groove volume in the region where the ground contact pressure and the ground contact length increase during braking. In this way, the snow column shear force during braking on snow-covered road surfaces can be ensured, making it possible to improve braking performance on snow-covered road surfaces. Further, the groove width of the lug grooves 20 other than the shoulder lug grooves 23 is less than the groove width of the shoulder lug grooves 23, making it possible to ensure the block rigidity of the block rows 35 other than the shoulder block rows 38. In this way, the block rigidity of the region where ground contact pressure readily increases under normal running conditions can be ensured, making it possible to reduce rolling resistance under normal running conditions. As a result, it is possible to more reliably reduce rolling resistance while maintaining snow traction performance.

Further, among the circumferential main grooves 10, the center circumferential main groove 11 has the smallest groove width, making it possible to ensure the block rigidity of the center region where ground contact pressure readily increases under normal running conditions and thus reduce rolling resistance under normal running conditions. Further, the groove width of the circumferential main grooves 10 other than the center circumferential main groove 11 is greater than the groove width of the center circumferential main groove 11, making it possible to ensure the groove volume of the shoulder region in which the ground contact pressure and the ground contact length increase during braking, and thus improve braking performance on snow-covered road surfaces. As a result, it is possible to more reliably reduce rolling resistance while maintaining snow traction performance.

Further, the shoulder circumferential main groove raised bottom portions 42 are formed on the shoulder circumferential main grooves 13 and the circumferential main groove raised bottom portions 43 are also formed on the center circumferential main groove 11 as the raised bottom portions 40, making it possible to ensure the block rigidity of the center region where ground contact pressure readily increases under normal running conditions and thus reduce rolling resistance. As a result, it is possible to more reliably reduce rolling resistance while maintaining snow traction performance.

Further, the blocks 30 are configured so that the ratio of the length LB in the tire circumferential direction to the width WB in the tire lateral direction of the blocks 30 positioned outward from the shoulder circumferential main grooves 13 in the tire lateral direction is less than that of the blocks 30 positioned inward from the shoulder circumferential main grooves 13 in the tire lateral direction, making it possible to improve uneven wear resistance. That is, the circumferential length of each of the regions outward from the shoulder circumferential main grooves 13 in the tire lateral direction is less than the circumferential length of the region inward from the shoulder circumferential main grooves 13 in the tire lateral direction and thus, under normal running conditions, the tread surface 3 readily slips on the road surface in the shoulder block rows 38 positioned outward from the shoulder circumferential main grooves 13 in the tire lateral direction. Thus, uneven wear such as heal and toe wear is readily generated in the shoulder block rows 38. Therefore, the ratio of the length LB to the width WB of the blocks 30 of the shoulder block rows 38 is configured to be small, making it possible to suppress heal and toe wear. That is, increasing the width WB with respect to the length LB of the blocks 30 of the shoulder block rows 38 makes it possible to ensure the rigidity of the blocks 30 in the tire lateral direction and thus suppress slippage on the trailing side of the blocks 30 and suppress heal and toe wear. As a result, uneven wear resistance can be improved.

Note that while the angle θ1 of the groove wall 27 of each of the center lug grooves 21 defining the leading side of the blocks 30 of the center block rows 36 in the tire rotation direction is greater than the angle θ2 of the groove wall 27 of each of the center lug grooves 21 defining the trailing side of the blocks 30 in the tire rotation direction in the embodiments described above, this same relationship between the angles of the groove walls 27 of the lug grooves 20 defining the blocks 30 may exist in the block rows 35 other than the center block rows 36. With the groove walls 27 of the lug grooves 20 defining the blocks 30 configured with this same form in the block rows 35 other than the center block rows 36 as well, it is possible to more reliably reduce rolling resistance and noise while maintaining snow traction performance.

Further, while the raised bottom portions 40 are formed in the shoulder lug grooves 23, the shoulder circumferential main grooves 13, and the center circumferential main groove 11 in the embodiments described above, the raised bottom portions 40 may be formed in other grooves. The raised bottom portions 40 are formed in the shoulder lug grooves 23, the shoulder circumferential main grooves 13, and preferably in the center circumferential main groove 11 as well, and preferably provided in other grooves as appropriate depending on size and use of the pneumatic tire 1. The raised bottom portions 40 are formed excluding the intersection portions 50 between the circumferential main grooves 10 and the lug grooves 20, regardless of the positions of groove formation, making it possible to ensure snow traction performance by the recessed portions 55 while ensuring block rigidity and reducing rolling resistance.

Further, while in the embodiment described above, five circumferential main groove 10 are formed, the number of circumferential main grooves 10 may be other than five. Regardless of the number of circumferential main grooves 10, the raised bottom portions 40 are formed on the shoulder circumferential main grooves 13 and the shoulder lug grooves 23 excluding the intersection portions 50 between the shoulder circumferential main grooves 13 and the shoulder lug grooves 23, thereby making it possible to reduce rolling resistance and noise while maintaining snow traction performance.

Examples

FIGS. 9A to 9C are tables showing the results of performance tests of pneumatic tires. In relation to the pneumatic tire 1 described above, performance evaluation tests conducted on a pneumatic tire of a conventional example, the pneumatic tire 1 according to the present technology, and pneumatic tire of a comparative example that are to be compared to the pneumatic tire 1 according to the present technology are described below. The performance evaluation tests were conducted on performance on snow and ice, which refers to traction performance during running on icy and snow-covered road surfaces, rolling resistance reduction performance, which refers to the ability to reduce rolling resistance during the rolling of the pneumatic tire 1, and noise performance, which refers to the performance of noise generated in association with the rolling of the pneumatic tire 1.

The performance evaluation tests were conducted by mounting the pneumatic tire 1 having a size of 315/80R22.5 defined by JATMA on a regular rim, adjusting the air pressure to 825 kPa, mounting the tire onto a 4×2 test vehicle with three axis trailer, and then conducting test runs. Each test item for performance on snow and ice was evaluated by having panelists drive the test vehicle with the pneumatic tire 1 to be evaluated mounted thereon, and conducting a feeling evaluation when running the test vehicle on a test course that included snow-covered and icy road surfaces. Performance on snow and ice is expressed by using the evaluation result of Conventional Example described later as an index value of 100. A larger index value indicates a greater degree of excellence in performance on snow and ice.

Further, rolling resistance reduction performance was evaluated according to the rolling resistance measured in accordance with the tire rolling resistance test method defined in ISO (International Organization for Standardization) 28580. This test was conducted by mounting the pneumatic tire 1 to be tested onto a regular rim, inflating the tire to regular internal pressure, applying a load equivalent to 85% the regular load, and measuring rolling resistance at a speed of 80 km/h using a drum testing machine provided with a drum having a diameter of 2 m. Rolling resistance reduction performance is expressed based on the test result by this test method using Conventional Example described later as an index value of 100. A larger index value indicates a smaller rolling resistance and thus a greater degree of excellence in rolling resistance reduction performance. Note that "Regular load" refers to "maximum load capacity" defined by JATMA, a maximum value given in "Tire Load Limits at Various Cold Inflation Pressures" defined by TRA, or "Load Capacity" defined by ETRTO.

Further, noise performance was evaluated on the basis of the measured volume of exterior pass-by noise in accordance with a tire noise test method defined in ISO 10844: 1994. In this test, the test vehicle with the pneumatic tire 1 to be tested mounted thereon run on a test course at a speed of 60 to 80 km/h, and the tire noise was measured eight times from both sides of the vehicle in the lateral direction, and calculate the average value thereof. Noise performance is expressed based on the measurement result by using Conventional Example described later as an index value of 100. A larger index value indicates a smaller sound pressure dB, and thus a greater degree of excellence in noise performance.

Performance evaluation tests were conducted on 12 pneumatic tires, namely a pneumatic tire of Conventional Example, which is one example of the pneumatic tire 1 in the related art, Examples 1 to 10 which are the pneumatic tires 1 according to the present technology, and Comparison Example, which is a pneumatic tire to be compared to the pneumatic tire 1 according to the present technology. Among these pneumatic tires 1, the pneumatic tire of Conventional Example is not provided with the raised bottom portion 40 on either of the shoulder circumferential main grooves 13 and the shoulder lug grooves 23. Further, the pneumatic tire of Comparative Example is provided with the raised bottom portions 40 on the shoulder circumferential main grooves 13 and the shoulder lug grooves 23, but is not provided with the recessed portions 55 in the intersection portions 50 between the shoulder circumferential main grooves 13 and the shoulder lug grooves 23.

In contrast, Examples 1 to 10, which are examples of the pneumatic tire 1 according to the present technology, are provided with the raised bottom portions 40 on all of the shoulder circumferential main grooves 13 and shoulder lug grooves 23 as well as with the recessed portions 55 in the intersection portions 50 between the shoulder circumferential main grooves 13 and the shoulder lug grooves 23. Further, the pneumatic tires 1 according to the Examples 1 to 10 each differ in terms of the relationship between the raised bottom height H of the raised bottom portions 40 and maximum groove depth D, the relative relationship between the raised bottom height H2 of the shoulder lug groove raised bottom portions 41 and the raised bottom height H1 of the shoulder circumferential main groove raised bottom portions 42, the relationship between the distance L2 from the inner end portion 25 of the shoulder lug groove 23 to the inner end portion 46 of the shoulder lug groove raised bottom portion 41 and the distance L1 from the inner end portion 25 to the outer end portion 26 of the shoulder lug groove 23, the relative relationship between the angle α of the wall portion 49 of the shoulder lug groove raised bottom portion 41 and the angle β of the wall portion 49 of the shoulder circumferential main groove raised bottom portion 42, and the relative relationship of the angles of the wall portions 49 on the leading and trailing sides of the shoulder circumferential main groove raised bottom portion 42 in the tire rotation direction.

As shown in FIGS. 9A to 9C, the results of the evaluation tests conducted using these pneumatic tires 1 indicate that the pneumatic tires 1 of Examples 1 to 10 can improve rolling resistance reduction performance and noise performance while maintaining performance on snow and ice in contrast to Conventional Example and Comparative Example. That is, the pneumatic tires 1 according to Examples 1 to 10 can reduce rolling resistance and noise while maintaining snow traction performance.

The invention claimed is:
1. A pneumatic tire, comprising:
a plurality of circumferential main grooves formed on a tread surface and extending in a tire circumferential direction;
a plurality of lug grooves formed on the tread surface and extending in a tire lateral direction; and
a plurality of blocks, both sides of each of the plurality of blocks being defined by the lug grooves in the tire circumferential direction and at least one end portion of each of the plurality of blocks being defined by the circumferential main grooves in the tire lateral direction; wherein
given, among the plurality of circumferential main grooves, the circumferential main grooves positioned most outward in the tire lateral direction as shoulder circumferential main grooves,
among the plurality of lug grooves, the lug grooves positioned outward from the shoulder circumferential main grooves in the tire lateral direction and connected to the shoulder circumferential main grooves from an outer side of the tire in the tire lateral direction as shoulder lug grooves,
the shoulder circumferential main grooves and the shoulder lug grooves each comprise a raised bottom portion on a groove bottom,
each raised bottom portion is formed to exclude at least an intersection portion where a shoulder circumferential main groove and a shoulder lug groove intersect,
the raised bottom portions are formed such that a raised bottom height of the raised bottom portion formed on the shoulder lug groove is greater than a raised bottom height of the raised bottom portion formed on the shoulder circumferential main groove,
given, among the plurality of circumferential main grooves, the circumferential main grooves positioned laterally inwardly adjacent to the shoulder circumferential main grooves as intermediate circumferential main grooves, among the plurality of lug grooves, the lug grooves positioned inward from the shoulder circumferential main grooves in the tire lateral direction and outward from the intermediate circumferential main grooves, and connected to the shoulder circumferential main grooves from the inner side of the tire in the tire lateral direction and connected to the intermediate circumferential main grooves from the outer side of the tire in the tire lateral direction as intermediate lug grooves, and the intermediate circumferential main grooves and the intermediate lug grooves are each formed devoid of a raised bottom portion on a groove bottom.

2. The pneumatic tire according to claim 1, wherein the raised bottom portions are configured such that a relationship between a raised bottom height H of each raised bottom portion and a maximum groove depth D of the shoulder circumferential main groove or the shoulder lug groove, where each raised bottom portion is formed, is within a range from $0.1 \leq (H/D) \leq 0.9$.

3. The pneumatic tire according to claim 2, wherein
given a position of a groove wall of the shoulder circumferential main groove facing an opening portion of the shoulder lug groove corresponding to the shoulder circumferential main groove as an end portion of the shoulder lug groove inward in the tire lateral direction,
the raised bottom portion formed on the shoulder lug groove is configured such that a relationship between a distance L2 in the tire lateral direction from the end portion of the shoulder lug groove inward in the tire lateral direction to an end portion of the raised bottom portion inward in the tire lateral direction, and a distance L1 in the tire lateral direction from the end portion of the shoulder lug groove inward in the tire lateral direction to an end portion of the shoulder lug groove outward in the tire lateral direction is within a range from $0.1 \leq (L2/L1) \leq 0.7$.

4. The pneumatic tire according to claim 3, wherein the raised bottom portions are configured such that an angle, with respect to the tread surface, of each wall portion of an end portion of the raised bottom portion formed on the shoulder circumferential main groove in a direction of extension of the shoulder circumferential main groove is greater than an angle, with respect to the tread surface, of each wall portion of an end portion of the raised bottom portion formed on the shoulder lug groove in a direction of extension of the shoulder lug groove.

5. The pneumatic tire according to claim 4, wherein
the pneumatic tire has a specified rotation direction, and
the raised bottom portion formed on the shoulder circumferential main groove is configured such that an angle, with respect to the tread surface, of the wall portion on the end portion side on a trailing side in the tire rotation direction is greater than that of the wall portion on the end portion side on a leading side in the tire rotation direction.

6. The pneumatic tire according to claim 5, wherein
the lug grooves are configured so that a plurality thereof are disposed in different positions in the tire lateral direction, and
an inclination angle of the lug grooves in the tire lateral direction with respect to the tire circumferential direction increases as the disposed position in the tire lateral direction increases in distance outward in the tire lateral direction from a center of the tread surface in the tire lateral direction.

7. The pneumatic tire according to claim 6, wherein
the pneumatic tire has a specified rotation direction,
the plurality of blocks are configured are aligned in the tire circumferential direction to form block rows,
the tread surface is provided with a plurality of block rows aligned in the tire lateral direction, and
the plurality of blocks of at least the block row that, among the plurality of block rows, is closest to a tire equator line are each configured such that a groove wall of the lug groove defining the leading side of each of the plurality of blocks in the tire rotation direction has a greater angle on an inner portion side of each of the plurality of blocks with respect to the tread surface than a groove wall of the lug groove defining the trailing side of each of the plurality of blocks in the tire rotation direction.

8. The pneumatic tire according to claim 7, wherein
the lug grooves are configured such that a plurality thereof are disposed in different positions in the tire lateral direction, and
the shoulder lug grooves, among the plurality of lug grooves disposed in different positions in the tire lateral direction, have a greatest groove width.

9. The pneumatic tire according to claim 8, wherein the plurality of circumferential main grooves are configured such that given, among the plurality of circumferential main grooves, the circumferential main groove positioned on the tire equator line as a center circumferential main groove, the center circumferential main groove has a smallest groove width.

10. The pneumatic tire according to claim 1, wherein
given a position of a groove wall of the shoulder circumferential main groove facing an opening portion of the shoulder lug groove corresponding to the shoulder circumferential main groove as an end portion of the shoulder lug groove inward in the tire lateral direction,
the raised bottom portion formed on the shoulder lug groove is configured such that a relationship between a distance L2 in the tire lateral direction from the end portion of the shoulder lug groove inward in the tire lateral direction to an end portion of the raised bottom portion inward in the tire lateral direction, and a distance L1 in the tire lateral direction from the end portion of the shoulder lug groove inward in the tire lateral direction to an end portion of the shoulder lug groove outward in the tire lateral direction is within a range from $0.1 \leq (L2/L1) \leq 0.7$.

11. The pneumatic tire according to claim 1, wherein the raised bottom portions are configured such that an angle, with respect to the tread surface, of each wall portion of an end portion of the raised bottom portion formed on the shoulder circumferential main groove in a direction of extension of the shoulder circumferential main groove is greater than an angle, with respect to the tread surface, of each wall portion of an end portion of the raised bottom portion formed on the shoulder lug groove in a direction of extension of the shoulder lug groove.

12. The pneumatic tire according to claim 1, wherein
the pneumatic tire has a specified rotation direction, and
the raised bottom portion formed on the shoulder circumferential main groove is configured such that an angle, with respect to the tread surface, of a wall portion on an end portion side on a trailing side in the tire rotation direction is greater than that of a wall portion on an end portion side on a leading side in the tire rotation direction.

13. The pneumatic tire according to claim 1, wherein
the lug grooves are configured so that a plurality thereof are disposed in different positions in the tire lateral direction, and
an inclination angle of the lug grooves in the tire lateral direction with respect to the tire circumferential direction increases as the disposed position in the tire lateral direction increases in distance outward in the tire lateral direction from a center of the tread surface in the tire lateral direction.

14. The pneumatic tire according to claim 1, wherein
the pneumatic tire has a specified rotation direction,
the plurality of blocks are configured are aligned in the tire circumferential direction to form block rows,
the tread surface is provided with a plurality of block rows aligned in the tire lateral direction, and
the plurality of blocks of at least the block row that, among the plurality of block rows, is closest to a tire equator line are each configured such that a groove wall of the lug groove defining a leading side of each of the plurality of blocks in the tire rotation direction has a greater angle on an inner portion side of each of the plurality of blocks with respect to the tread surface than a groove wall of the lug groove defining a trailing side of each of the plurality of blocks in the tire rotation direction.

15. The pneumatic tire according to claim 1, wherein
the lug grooves are configured such that a plurality thereof are disposed in different positions in the tire lateral direction, and
the shoulder lug grooves, among the plurality of lug grooves disposed in different positions in the tire lateral direction, have a greatest groove width.

16. The pneumatic tire according to claim 1, wherein the plurality of circumferential main grooves are configured such that given, among the plurality of circumferential main grooves, the circumferential main groove positioned on a tire equator line as a center circumferential main groove, the center circumferential main groove has a smallest groove width.

17. The pneumatic tire according to claim 16, wherein the raised bottom portions are formed on at least the center circumferential main groove and the shoulder circumferential main groove.

18. The pneumatic tire according to claim 1, wherein the plurality of blocks are configured such that a ratio of a length in the tire circumferential direction to a width in the tire lateral direction of the blocks positioned outward from the shoulder circumferential main grooves in the tire lateral direction is less than that of the blocks positioned inward from the shoulder circumferential main grooves in the tire lateral direction.

* * * * *